United States Patent
Tang et al.

(10) Patent No.: US 11,056,133 B2
(45) Date of Patent: Jul. 6, 2021

(54) WRITER WITH HMTS (HIGH MOMENT TRAILING SHIELD) ALIGNED WITH SPIN LAYER

(71) Applicant: Headway Technologies, Inc., Milpitas, CA (US)

(72) Inventors: Yuhui Tang, Milpitas, CA (US); Ying Liu, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 17/024,859

(22) Filed: Sep. 18, 2020

(65) Prior Publication Data

US 2021/0012794 A1    Jan. 14, 2021

Related U.S. Application Data

(62) Division of application No. 16/507,177, filed on Jul. 10, 2019.

(51) Int. Cl.
| | | |
|---|---|---|
| *G11B 5/31* | (2006.01) | |
| *G11B 5/127* | (2006.01) | |
| *G11B 25/04* | (2006.01) | |
| *G11B 5/39* | (2006.01) | |
| *G11B 5/11* | (2006.01) | |
| *G11B 5/00* | (2006.01) | |

(52) U.S. Cl.
CPC .............. *G11B 5/1278* (2013.01); *G11B 5/11* (2013.01); *G11B 5/314* (2013.01); *G11B 5/315* (2013.01); *G11B 5/3113* (2013.01); *G11B 5/3116* (2013.01); *G11B 5/3133* (2013.01); *G11B 5/3146* (2013.01); *G11B 5/3153* (2013.01); *G11B 5/3163* (2013.01); *G11B 5/3909* (2013.01); *G11B 25/043* (2013.01); *G11B 2005/0024* (2013.01)

(58) Field of Classification Search
None
See application file for complete search history.

(56) References Cited

U.S. PATENT DOCUMENTS

| | | |
|---|---|---|
| 6,785,092 B2 | 8/2004 | Covington et al. |
| 7,589,600 B2 | 9/2009 | Dimitrov et al. |
| | (Continued) | |

OTHER PUBLICATIONS

Co-pending U.S. Appl. No. 16/507,177, filed Jul. 10, 2019, "Writer With HMTS (High Moment Trailing Shield) Aligned With Spin Layer," by Yuhui Tang et al., 30 pages.

(Continued)

*Primary Examiner* — William J Klimowicz
(74) *Attorney, Agent, or Firm* — Saile Ackerman LLC; Stephen B. Ackerman (57) ABSTRACT

A PMR (perpendicular magnetic recording) write head configured for microwave assisted magnetic recording (MAMR) includes a spin-torque oscillator (STO) and trailing shield formed of high moment magnetic material (HMTS). By patterning the STO and the HMTS in a simultaneous process the HMTS and the STO layer are precisely aligned and have very similar cross-track widths. In addition, the write gap at an off-center location has a thickness that is independent from its center-track thickness and the write gap total width can have a flexible range whose minimum value is the same width as the STO width.

7 Claims, 7 Drawing Sheets

(56) References Cited

U.S. PATENT DOCUMENTS

| | | | |
|---|---|---|---|
| 7,957,098 B2 | 6/2011 | Yamada et al. | |
| 8,320,079 B2 | 11/2012 | Iwasaki et al. | |
| 8,446,690 B2 | 5/2013 | Alex et al. | |
| 8,498,079 B1 | 7/2013 | Song et al. | |
| 8,547,661 B2 | 10/2013 | Bai | |
| 8,995,088 B1 | 3/2015 | Boone | |
| 9,047,894 B2 | 6/2015 | Chiu | |
| 9,508,364 B1 | 11/2016 | Tang | |
| 9,536,548 B1 | 1/2017 | Narayana | |
| 9,558,765 B2 | 1/2017 | Zhang et al. | |
| 9,626,990 B2 | 4/2017 | Tang et al. | |
| 9,747,932 B1 | 8/2017 | Taguchi | |
| 10,032,470 B1 | 7/2018 | Degawa | |
| 10,121,497 B1 | 11/2018 | Takahashi et al. | |
| 10,210,888 B1 | 2/2019 | Li | |
| 10,366,714 B1 | 7/2019 | Olson | |
| 10,446,178 B1 | 10/2019 | Tang | |
| 10,522,178 B1 | 12/2019 | Liu | |
| 10,714,129 B1 * | 7/2020 | Tang | G11B 5/35 |
| 10,811,034 B1 * | 10/2020 | Wu | G11B 5/3143 |
| 2009/0080106 A1 | 3/2009 | Shimizu et al. | |
| 2012/0295132 A1 | 11/2012 | Min | |
| 2013/0329316 A1 | 12/2013 | Watanabe | |
| 2015/0043106 A1 | 2/2015 | Yamada | |
| 2016/0148627 A1 | 5/2016 | Nagasaka | |
| 2016/0218728 A1 | 7/2016 | Zhu | |
| 2017/0061995 A1 | 3/2017 | Taguchi | |
| 2017/0133044 A1 | 5/2017 | Lim | |
| 2018/0025746 A1 | 1/2018 | Okamura et al. | |
| 2018/0075868 A1 | 3/2018 | Koui et al. | |
| 2019/0251992 A1 | 8/2019 | Ho | |
| 2019/0259413 A1 | 8/2019 | Le | |
| 2019/0279665 A1 | 9/2019 | Li | |

OTHER PUBLICATIONS

Co-pending U.S. Appl. No. 16/507,179, filed Jul. 10, 2019, "Writer With Narrower High Moment Trailing Shield," by Yuhui Tang et al., 22 pages.

U.S. Office Action, U.S. Appl. No. 16/507,177, Applicant: Tang et al., dated Mar. 5, 2020, 11 pages.

U.S. Office Action, U.S. Appl. No. 16/507,179, Applicant: Tang et al., dated Feb. 19, 2020, 13 pages.

U.S. Notice of Allowance, U.S. Appl. No. 16/507,177, Applicant: Tang et al., dated Aug. 6, 2020, 9 pages.

U.S. Notice of Allowance, U.S. Appl. No. 16/507,177, Applicant: Tang et al., dated Oct. 16, 2020, 10 pages.

U.S. Notice of Allowance, U.S. Appl. No. 16/507,179, Applicant: Tang et al., dated Aug. 24, 2020, 7 pages.

* cited by examiner

WRITER WITH HMTS (HIGH MOMENT TRAILING SHIELD) ALIGNED WITH SPIN LAYER

This is a Divisional Application of U.S. patent application Ser. No. 16/507,177, filed on Jul. 10, 2019, which is assigned to a common assignee and herein incorporated by reference in its entirety.

This application is related to U.S. patent application Ser. No. 16/507,179, filed on Jul. 10, 2019, which is assigned to a common assignee and herein incorporated by reference in its entirety.

BACKGROUND

1. Technical Field

This disclosure relates generally to a thin-film magnetic writer used in microwave assisted magnetic recording (MAMR) to write on highly coercive recording disks and particularly to the use of a high moment trailing shield (HMTS) in such a writer.

2. Background

To further increase the magnetic recording density of a hard disk drive (HDD) system, there have been growing demands for the improvements in the performance of thin film magnetic heads. A perpendicular magnetic recording (PMR) head combining a single pole writer with a tunneling magnetoresistive (TMR) reader provides a high writing field and a large read-back signal, thus a higher areal density can be achieved. Increasing the magnetic recording areal density requires smaller grain size in the magnetic recording media, which in turn reduces storage lifetime due to thermal instabilities. In order to maintain durable storage lifetime, the thermal stability (energy barrier $\Delta=KV/k_bT$) has to be increased. In the formula, $k_b$ is the Boltzmann constant, T is the temperature in Kelvin, V is the average grain size of the storage media, K, magnetic anisotropy, is equal to $H_kM_s/2$, where $H_k$ is the magnetic anisotropy field and $M_s$ is the saturation magnetization of the magnetic recording media. For smaller grain size media, K has to be increased to maintain the same thermal stability for storage, thus $H_k$ is greatly increased causing the magnetic media to have high coercivity $H_c$. As a consequence, the magnetic field generated by the magnetic writer main pole as well as the current from the coil around the main pole may not be strong enough to switch the magnetic media bits for data recording.

One way to address this magnetic recording dilemma is by heat-assisted magnetic recording (HAMR). The purpose of HAMR is to use heat energy to reduce the energy barrier ($\Delta=KV/k_bT$) of the grains of the magnetic recording media while writing the data with magnetic recording field. During data writing, a magnetic bit in the media is heated by the application of laser-generated optical energy, in the form of surface-plasmon near-fields, causing the temperature of the magnetic bit to rise. When the temperature of the bit is significantly elevated, it can be reversed in polarity by the applied magnetic field due to a reduction in the energy barrier $\Delta$. Once the bit polarity is changed, both the heating source and the applied field are quickly withdrawn. As the temperature reverts to room temperature, the switched state of the bit is stored in the magnetic recording media.

Another approach to addressing the magnetic recording dilemma, and the subject of this disclosure, is the application of microwave assisted magnetic recording (MAMR). In microwave-assisted magnetic recording (MAMR), the energy barrier that prevents the polarity of a magnetic bit from being reversed by an applied magnetic field is not reduced by optical heating, but rather by supplying the bit with resonant energy from an external oscillating magnetic field produced by an additional element called a spin-torque oscillator (STO). This element is a multi-layer that is positioned within a gap region that surrounds the main magnetic pole.

The STO is usually aligned with the main pole (MP) cross-track width in order to maximize its performance. A high moment trailing shield (HMTS) is used to attract the MP field to return to the trailing side of the MP in order to improve the bits per inch (BPI) property of the writer. In conventional designs, the HMTS is much wider than the MP in cross-track dimension. At least two problems are related to this greater width:
1. The HMTS has more protrusion than surrounding shields, exposing the STO to more reliability concerns;
2. The wider HMTS induces more magnetic charge in the write gap corner, and will cause a stronger stray field.

The prior art reveals several approaches that demonstrate an awareness of these problems and attempts to resolve them. However, none of these prior art publications show the presently disclosed method nor do they provide a solution that is as effective as the presently disclosed method.

SUMMARY

It will be an object of the present disclosure to provide a design for a spin-torque assisted (i.e., "microwave assisted" or MAMR) magnetic recording head to be used in hard disk drives (HDD) in which the HMTS is patterned together with the STO layer. This design benefits from less high moment material being exposed at the ABS for less protrusion, better STO reliability and better EWAC curvature.

Figure 1A:
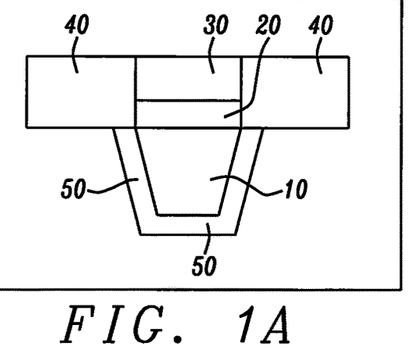
FIG. 1A is a schematic illustration of an ABS view of the MAMR writer head of the presently disclosed design.
Figure 1B:
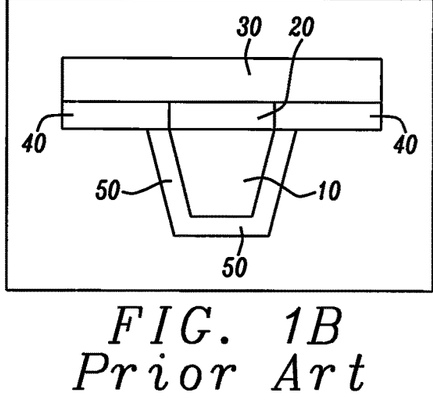
FIG. 1B is a schematic illustration of an ABS view of the MAMR writer head of the prior art.

Referring first to FIG. 1B, there is shown a schematic ABS illustration of a conventional, prior-art MAMR writer design. Alongside prior-art FIG. 1B is FIG. 1A, that shows the presently disclosed new design. In each figure the magnetic pole (MP) is labeled 10, the STO is labeled 20 and the HMTS is labeled 30.

As FIG. 1A shows, the HMTS 30 in the new design has less width (in the cross-track dimension) at the ABS than the conventional writer, leaving non-magnetic write gap (WG) 50 thicker in the off-track-center part 40.

More specifically, the design and its method of fabrication to be described herein provides the following improvements over the prior art methods:
1. HMTS has a similar width as the STO;
2. Write gap (WG) at off-track-center locations has a thickness that is independent of the write gap center thickness. The off-center WG thickness can range from approximately 2 nm to 50 nm.
3. WG total width can have a flexible range wherein the minimum width is the STO width. This range can vary between approximately 10 nm and 14 nm. The HMTS and the STO have similar widths to the main pole.

These benefits are all provided by a PMR magnetic writer that is configured for microwave assisted magnetic recording (MAMR) and is fabricated as follows. First a dielectric layer is deposited that has a planar trailing-edge surface, an air-bearing surface (ABS) plane perpendicular to the planar trailing-edge surface and a trapezoidal trench formed symmetrically through the planar upper surface, projecting rearward in a direction perpendicular to said ABS plane and opening at the ABS surface. This trench is wider at its planar trailing-edge surface and tapers downward to form a narrower leading edge. A main magnetic pole (MP) emerges through this trench, the MP having a trapezoidal planar ABS face symmetrically positioned within the trench at an air-bearing surface (ABS) plane. The MP face is separated from walls of said trench by symmetrically placed side gaps (SG) and a leading-edge gap (LG).

A uniformly thick spin torque oscillator (STO) layer is formed contiguous with the planar upper surface of the dielectric layer. This STO layer covers the planar upper surface, the openings of the SGs and the trailing edge surface of the MP.

Then a uniformly thick, high moment trailing shield (HMTS) layer is formed contiguously over the STO layer. The HMTS and STO layers are trimmed in a single trimming process so that these two layers are aligned with each other and have equal widths that are equal to the trailing edge width of said MP. Then a write gap (WG) layer is formed which extends symmetrically from each side of the trimmed HMTS and STO layers, so that the WG layer covers at least a portion of the planar trailing edge surface of the dielectric layer and completely covers the SG layers where they emerge at the dielectric layer at each side of said trench opening. Finally the WG layer is laterally trimmed to a final width and a trailing shield is formed over the fabrication.

DETAILED DESCRIPTION

We have already discussed FIG. 1B above, which shows a schematic ABS illustration of a conventional, prior-art MAMR writer design. Alongside prior-art FIG. 1B is FIG. 1A, showing the presently disclosed new design. In each figure the magnetic pole (MP) is labeled 10, the the STO is labeled 20 and the HMTS is labeled 30.

As FIG. 1A shows, the HMTS in the new design has less width (in the cross-track dimension) at the ABS than the conventional writer, leaving the non-magnetic write gap 40 thicker in the off-track-center part. The MP is surrounded by a non-magnetic dielectric material 50. We will now describe the method by which the design of FIG. 1A is achieved.

Figure 2A:
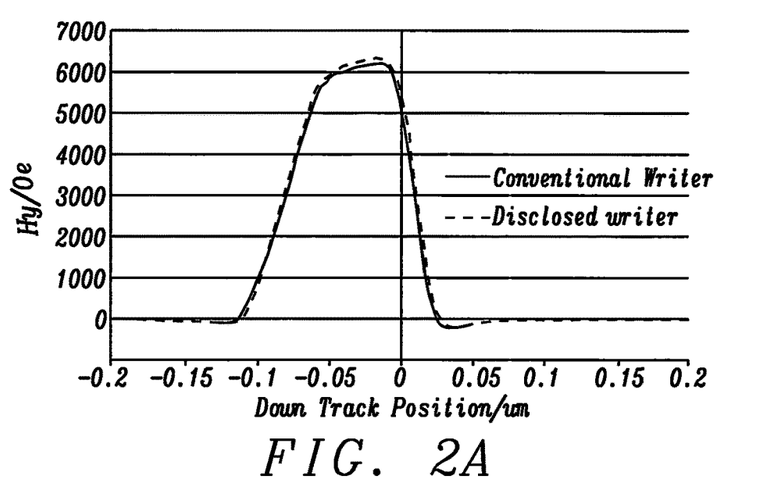
FIG. 2A is the result of a finite-element method (FEM) simulation showing the down-track profile (Hy in Oe, vs. down-track position in μm) of the perpendicular writer field (Hy) of a conventional prior-art writer (of FIG. 1B) vs. that of the presently disclosed writer (of FIG. 1A).

To demonstrate the performance of the proposed design, a pair of finite-element method (FEM) simulations have been conducted for both the conventional writer and new writer. FIG. 2A shows the results of an FEM simulation comparing the conventional writer with the newly disclosed writer with respect to the down track profile of the perpendicular writer field (Hy).

Figure 2B:
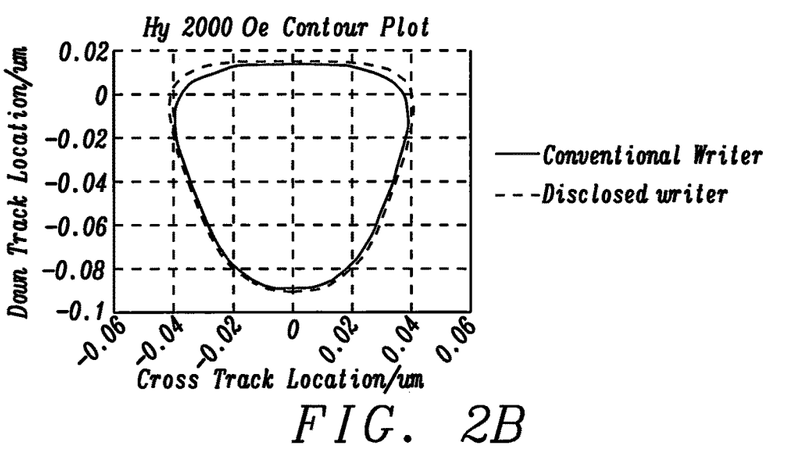
FIG. 2B is the contour plot (down-track in μm vs. cross-track in μm) of Hy at 2000 Oe for the same two writers as in FIG. 2A.

FIG. 2B shows the results of a FEM simulation used to obtain a contour plot of Hy at 2000 Oe in the down-track vs. cross-track plane. The simulation is based on a write gap cross-track width of 360 nm, a STO width of 40 nm, a PWA (pole width A) of 40 nm and an HMTS down track thickness of 70 nm.

The simulation results are graphed in FIGS. 2A and 2B. Because the write gap of the presently disclosed writer is thicker at the off track location, the write field becomes stronger there. Comparing the contour plot of both write fields, the presently disclosed writer shows a much flatter trailing edge (top edge) than the conventional writer, which also helps improve BPI when writing.

Figure 3A:
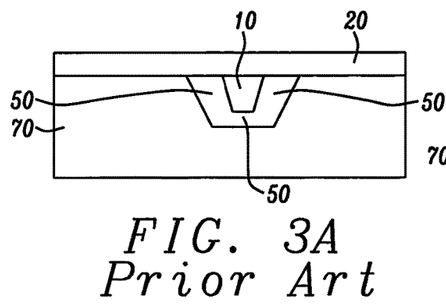
FIGS. 3A-3V are a series of illustrations showing successive steps in the fabrication of the presently disclosed writer and the corresponding steps that would be carried out on a prior art writer. The figures separately show an ABS view and a cross-sectional view in a plane perpendicular to the ABS at each step of the process.
Figure 3B:
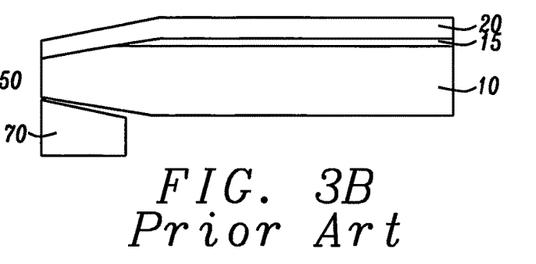
Figure 3C:
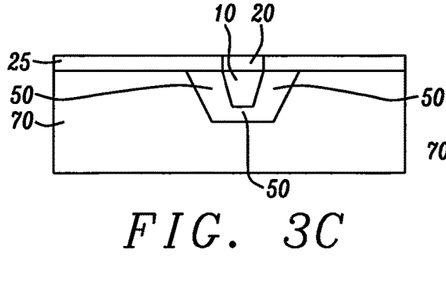
Figure 3D:
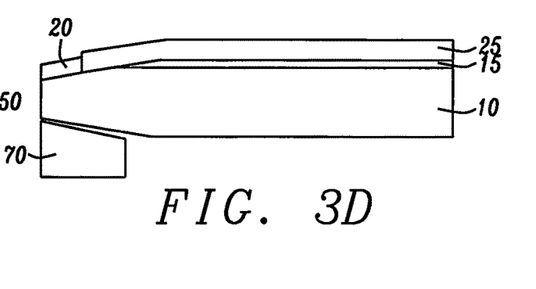
Figure 3E:
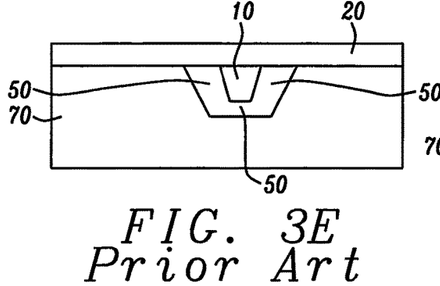
Figure 3F:
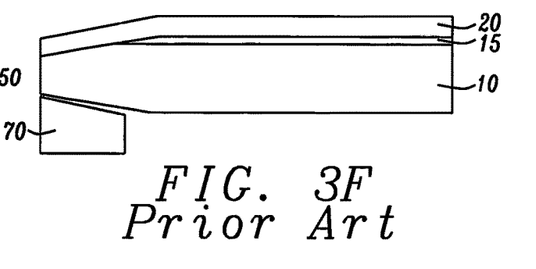
Figure 3G:
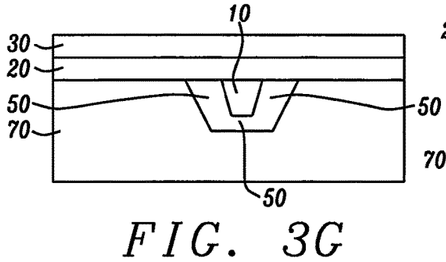
Figure 3H:
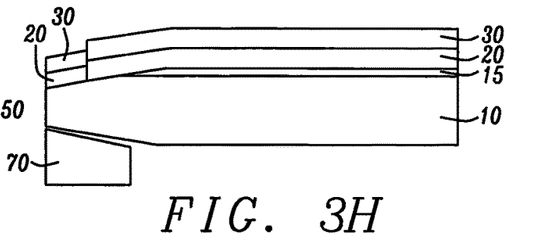
Figure 3I:
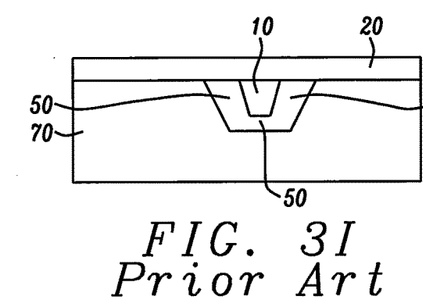
Figure 3J:
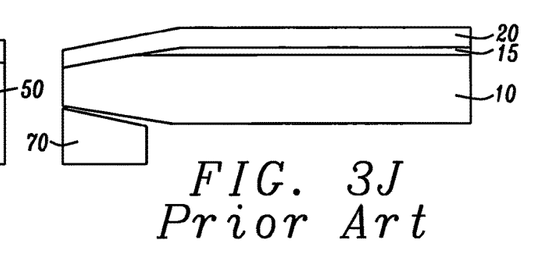
Figure 3K:
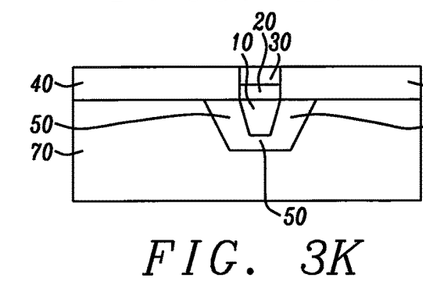
Figure 3L:
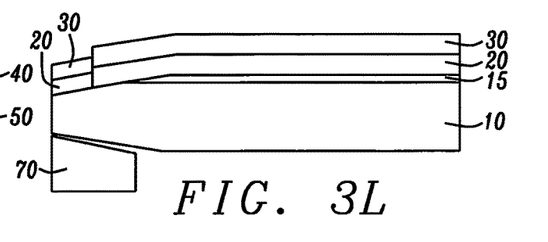
Figure 3M:
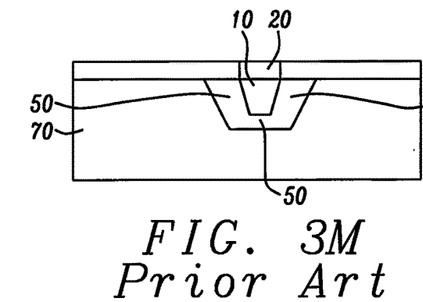
Figure 3N:
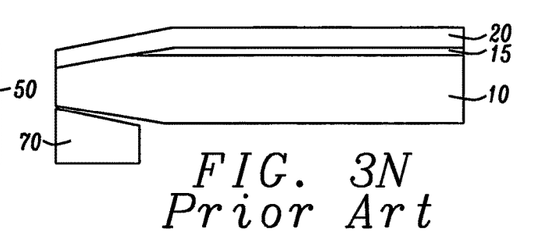
Figure 3O:
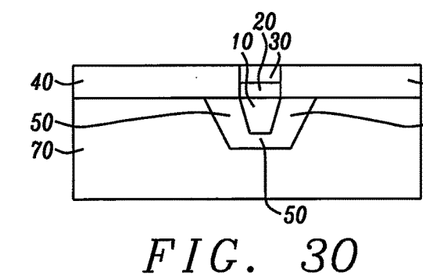
Figure 3P:
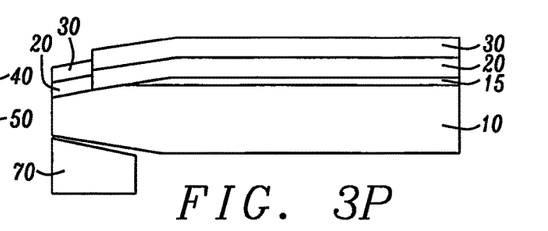
Figure 3Q:
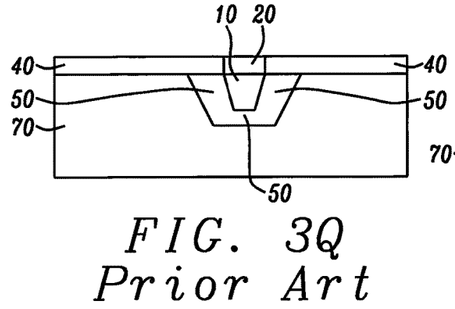
Figure 3R:
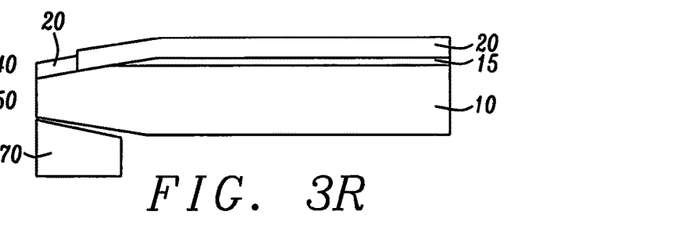
Figure 3S:
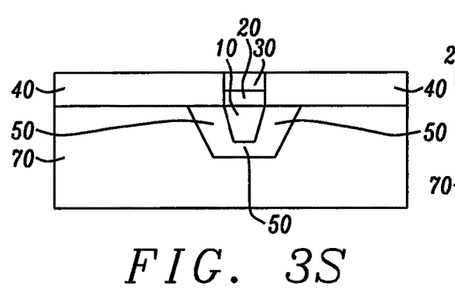
Figure 3T:
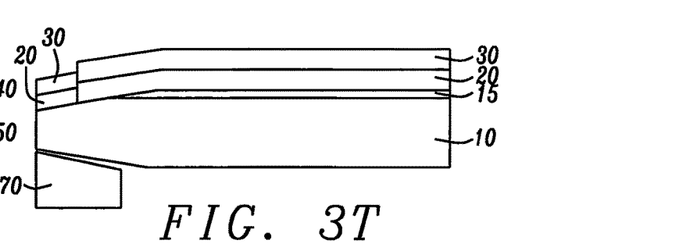
Figure 3U:
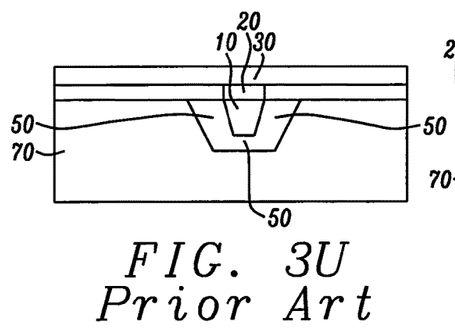
Figure 3V:
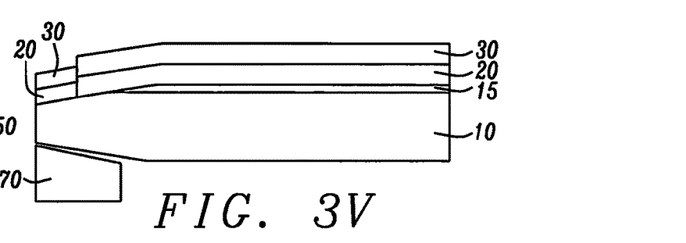
Figure 3W:
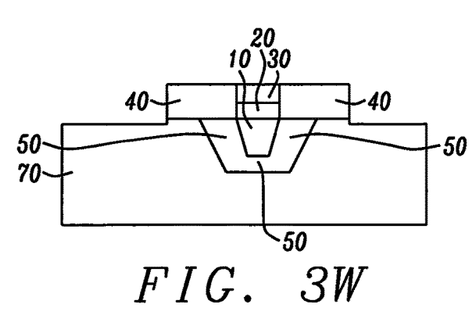
FIGS. 3W-3Z are all ABS views of the remaining steps carried out on the prior art and presently disclosed writer.
Figure 3X:
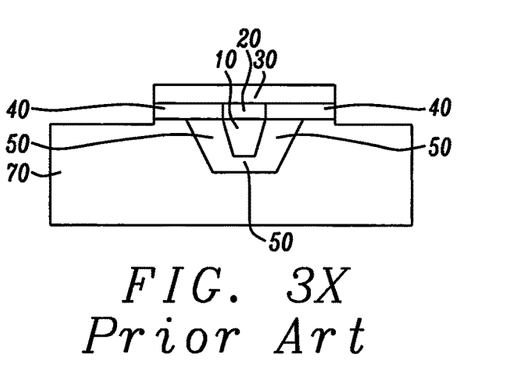
Figure 3Y:
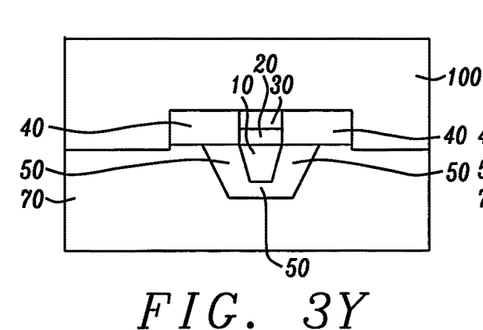
Figure 3Z:
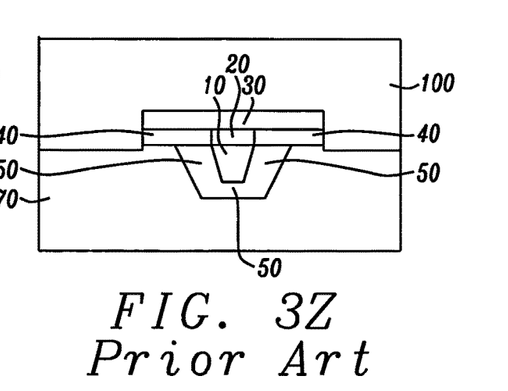

The following sequence of processes, illustrated in FIGS. 3A-3Z, provide a step-by-step comparison between the conventional (prior-art) method of forming a typical prior-art writer and the method provided for forming the presently disclosed writer. The figures will be arranged pair-wise, to include both a schematic ABS view of the process (3A, 3C, 3E, etc.) step and a companion side cross-sectional view (3B, 3D, 3F, etc.) in a plane perpendicular to the ABS and extending away from the ABS while passing through the central axis of the MP.

We begin the sequence description with prior-art FIG. 3A (ABS view) and FIG. 3B (cross-sectional view), which we will consider as the initial step in the fabrication sequence for both processes, the newly disclosed process and the prior art process. Everything up to this point is considered to have proceeded according to common, well-known steps in the prior art and they have now led to this step in the process (FIGS. 3A and 3B), which is a STO deposition and its annealing. Previous steps are not shown herein. Note the STO is a multilayered construction but it is here referred to as a "layer". Thus FIGS. 3A and 3B will be considered as illustrating the initial step of both the prior-art fabrication and the fabrication of the presently disclosed methodology.

Examining FIG. 3A (ABS view), we see the main magnetic pole (MP) that is labeled 10, and the STO that is labeled 20. The main magnetic pole is partially surrounded by two symmetrically disposed, non-magnetic dielectric-filled side gaps and by a leading-edge gap, all commonly deposited and all labeled 50. A dielectric (non-magnetic) filled region 70 extends symmetrically to either side of the pole 10.

Looking now at the schematic cross-sectional view in FIG. 3B, which is in a plane perpendicular to the ABS plane and which passes centrally through the axis of the MP 10, there is seen the STO layer 20, which is a stacked multi-layer, extending rearward away from the ABS plane and formed over the top (trailing edge) of the MP 10. A thin layer of non-magnetic material 15 has been formed between the STO and the MP.

FIG. 3C shows the first process step of the disclosed process carried out on the fabrication shown in FIG. 3A. As is is seen in the ABS view of FIG. 3C the STO layer 20 has been patterned (trimmed) by an IBE (ion-beam etch) to reduce its width in the cross-track direction. The cross-sectional view of FIG. 3D shows that a separate STO 20 patterning step also reduces the dimension of the STO 20 in the direction away from the ABS plane. A layer of non-magnetic material 25 replaces the portion of the STO that has been trimmed away by the two patterning steps.

FIGS. 3E and 3F show, schematically, that the conventional (prior art) writer at this stage has not yet received additional processing and remains unchanged from its initial state shown in FIGS. 3A and 3B.

Referring now to FIG. 3G there is shown the next process step of the disclosed process carried out on the writer of FIG. 3C. In the ABS view of FIG. 3G there is shown, schematically, the formation of a high-moment trailing shield (HMTS) 30 formed over the STO layer 20. In the cross-sectional view, the shield is shown extending rearward away from the ABS, but the STO layer 20 does not extend rearward correspondingly with the HMTS layer 30. The HMTS material is typically magnetic material having Bs between 18 kG and 24 kG Referring now to FIGS. 3I and 3J, there is shown the prior-art writer as yet having received no further processing and looking the same as in FIGS. 3A and 3C.

Referring now to FIG. 3K, there is shown the next process step of the presently disclosed process in which the STO layer 20 and the HMTS layer 30 are trimmed so that they share a common cross-track width. A layer of write-gap (WG) material 40 is deposited symmetrically to each side of the patterned STO and HMTS layers.

Referring now to FIG. 3G there is shown the next step in processing the disclosed writer. As shown in the ABS view of 3G, a HMTS layer 30 has been deposited on the the STO layer 20. The cross-sectional view of FIG. 3H shows that the STO layer 20 is trimmed in the rearward direction but the HMTS layer extends rearward to cover a thin dielectric layer. No HMTS has as yet been formed on the conventional writer.

Referring now to the prior art process in FIGS. 3I and 3J, there is shown no additional process steps of the prior art process relative to FIGS. 3E and 3F.

Referring now to FIGS. 3K and 3L, there is shown the next step after FIGS. 3G and 3H in the processing of the disclosed writer. In this step, shown in the ABS view of FIG. 3K, the HMTS layer 30 and the STO layer 20 are simultaneously trimmed to have the same cross-track widths and also to have the same cross-track width as the width of the trailing edge of the MP 10. A write gap layer 40 is deposited over the laterally disposed region from which the STO and HMTS layers were removed by trimming. The write gap layer is formed of a non-magnetic dielectric material and can be deposited in a range of widths and thicknesses, the minimum thickness of which is the thickness of the STO layer 20. The off-center thickness can range from 2 nm to 50 nm. The write gap total width has a flexible range whose minimum value is the same width as the STO width. This range can be between approximately 10 nm and 1 μm.

Referring now to FIGS. 3M and 3N, there is shown no change in the prior art writer as compared to FIGS. 3I and 3J.

Referring now to FIGS. 3O and 3P there is shown no new steps in the disclosed process as compared to FIGS. 3K and 3L.

Referring now to FIGS. 3Q and 3R there is shown the ABS and side views of the next process step applied to the prior art writer in which the STO material 20 is trimmed laterally to match the width of the trailing edge of the MP 10. A WG layer 40 is deposited over the laterally disposed region from which the STO layer had been trimmed away.

Note that the presently disclosed process offers the benefit that the write gap width and thickness can be varied, whereas in the prior art process, where the HMTS must finally be deposited on a planar surface, the width and thickness cannot be varied. Further, a wider write gap can provide improved overwrite (OW) performance and a narrower and thinner HMTS can reduce adjacent track interference (ATI), so the improved flexibility in providing these widths and thicknesses in the disclosed process is a major benefit.

Referring now to FIGS. 3U and 3V there is shown the ABS and side views of the views of the prior art process in which a HMTS layer 30 is now deposited. The HMTS layer is here deposited over the WG layer 40 that has the uniform thickness of the STO layer 20.

Referring now FIGS. 3W and 3X that show side-by-side ABS views after final patterning of the disclosed writer (3W) and the prior art writer (3X) have been done. As can be seen, the disclosed writer has a thicker write-gap layer 40 and equal width narrow HMTS 30 and STO 20 layers that match the width of the MP 10. The prior art writer shows a HMTS layer 30 that is wider than the STO layer 20 and a thinner WG layer 40.

Referring finally to FIGS. 3Y and 3Z, there is shown the finally fabricated writers of FIGS. 3W and 3X with the addition of a trailing shield 100 formed over them. The trailing shield is formed of magnetic material having a $B_s$ value between approximately 1 kG and 18 kG, typically 16 kG being used. The down-track (DT) thickness is between approximately 100 nm and 2 μm and the cross-track width, similar to all other shields, being in the range between approximately 4 μm and 30 μm.

Among the advantages that result from this new design and the method used for its fabrication are:

(1) The HMTS and STO are precisely aligned and have similar widths, which is a result of their simultaneous patterning (see 30 and 20 in FIG. 3W);

(2) The write gap at an off-center location has a thickness that is independent of its center thickness. See FIG. 3K where the write gap layer 40 can be deposited with an arbitrary thickness after the STO 20 and HTMS 30 are trimmed. The off-center thickness can range from 2 nm to 50 nm;

(3) The write gap total width can have a flexible range whose minimum value is the same width as the STO width. The range can be between approximately 10 nm to 1 μm Referring now to FIGS. 4, 5 and 6, there is shown the elements of a magnetic recording apparatus, such as a MAMR configured hard disk drive (HDD), through whose use the PMR writer described above will meet remaining objects of this disclosure.

Figure 4:
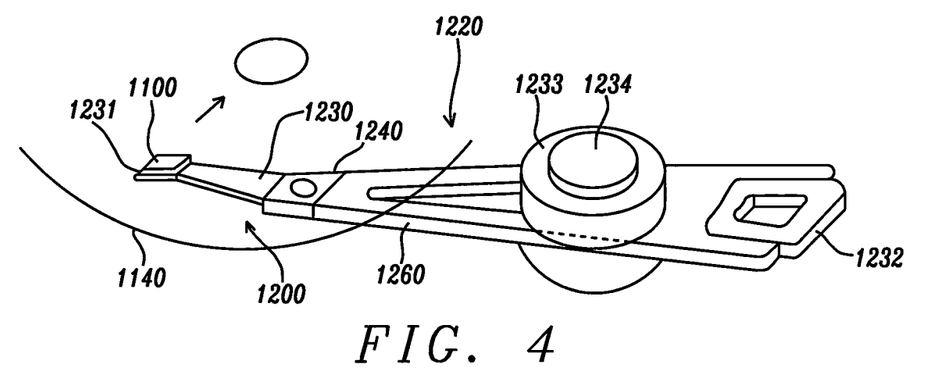
FIG. 4 schematically shows a perspective view of a head arm assembly of the present recording apparatus.

FIG. 4 shows a head gimbal assembly (HGA) 1200 that includes a slider-mounted PMR writer 1100, the slider now providing aerodynamic support to the writer when it moves above or below an operational disk recording medium 1140. There is also shown a suspension 1220 that elastically supports the slider-mounted writer 1100. The suspension 1220 has a spring-like load beam 1230 made with a thin, corrosion-free elastic material like stainless steel. A flexure 1231 is provided at a distal end of the load beam and a base-plate 1240 is provided at the proximal end. The slider mounted TAMR writer 1100 is attached to the load beam 1230 at the flexure 1231 which provides the TAMR with the proper amount of freedom of motion. A gimbal part for maintaining the PMR read/write head at a proper level is provided in a portion of the flexure 1231 to which the TAMR 1100 is mounted.

A member to which the HGA 1200 is mounted to arm 1260 is referred to as head arm assembly 1220. The arm 1260 moves the read/write head 1100 in the cross-track direction (arrow) across the medium 1140 (here, a hard disk). One end of the arm 1260 is mounted to the base plate 1240. A coil 1232 to be a part of a voice coil motor (not shown) is mounted to the other end of the arm 1260. A bearing part 1233 is provided to the intermediate portion of the arm 1260. The arm 1260 is rotatably supported by a shaft 1234 mounted to the bearing part 1233. The arm 1260 and the voice coil motor that drives the arm 1260 configure an actuator.

Figure 5:
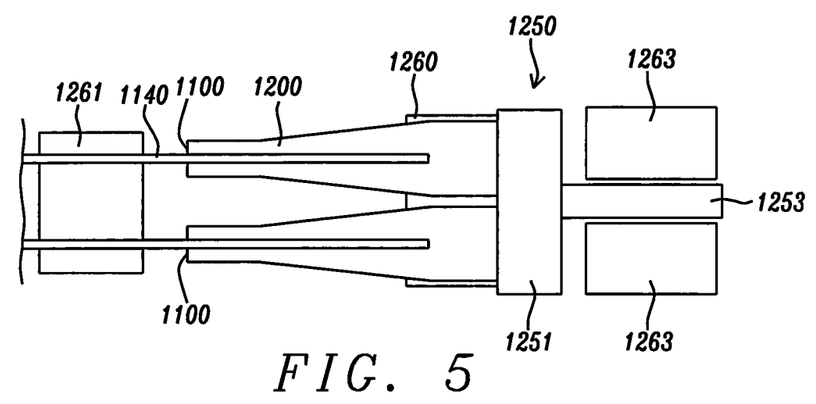
FIG. 5 schematically shows a side view of a head stack assembly of the present recording apparatus.
Figure 6:
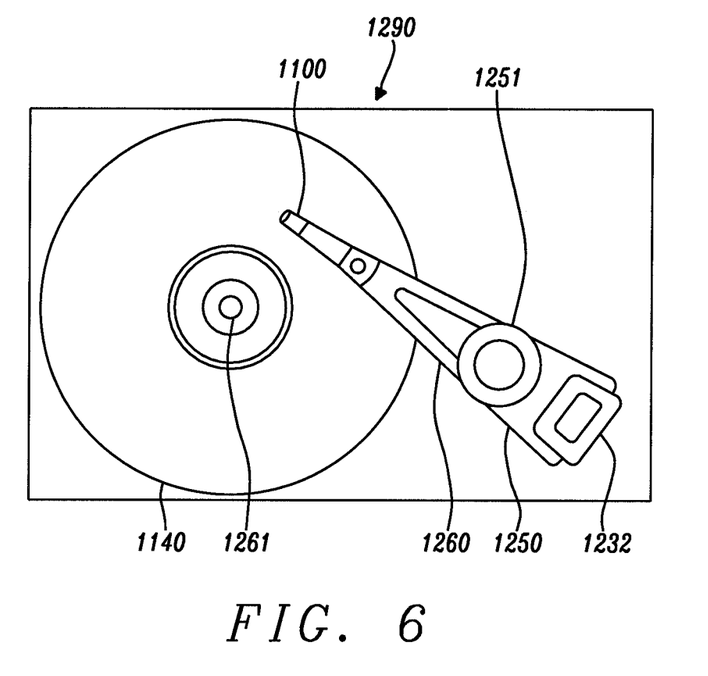
FIG. 6 schematically shows a plan view of the magnetic recording apparatus within which are mounted the components shown in FIGS. 4 and 5.

Referring next to FIG. 5 and FIG. 6, there is shown a head stack assembly 1250 and a magnetic recording apparatus in which the slider-mounted TAMR writer 1100 is contained. The head stack assembly is an element to which the HGA 1200 is mounted to arms of a carriage having a plurality of arms for engaging with a plurality of disks 1140. The plurality of disks are mounted on a spindle 1261. FIG. 5 is a side view of this assembly and FIG. 6 is a plan view of the entire magnetic recording apparatus.

Referring finally to FIG. 6, the head stack assembly 1250 is shown incorporated into a magnetic recording apparatus 1290. The magnetic recording apparatus 1290 has a plurality of magnetic recording media 1114 mounted on a spindle motor 1261. Each individual recording media 1114 has two TAMR elements 1100 arranged opposite to each other across the magnetic recording media 1140 (shown clearly in FIG. 5). The head stack assembly 1250 and the actuator (except for the write head itself) act as a positioning device and support the PMR heads 1100. They also position the PMR heads correctly opposite the media surface in response to electronic signals. The read/write head records information onto the surface of the magnetic media by means of the magnetic pole contained therein.

As is finally understood by a person skilled in the art, the detailed description given above is illustrative of the present disclosure rather than limiting of the present disclosure. Revisions and modifications may be made to methods, materials, structures and dimensions employed in forming and providing a PMR writer configured for MAMR operation having a high moment trailing shield (HMTS) that is aligned with a spin torque oscillator layer (STO), while still forming and providing such a structure and its method of formation in accord with the spirit and scope of the present invention as defined by the appended claims.

We claim:

1. A method of fabricating a PMR magnetic writer that is configured for microwave assisted magnetic recording (MAMR), comprising:

providing a dielectric layer having a planar trailing-edge surface, an air-bearing surface (ABS) plane perpendicular to said planar trailing-edge surface and a trapezoidal trench formed symmetrically therein through said planar trailing-edge surface, projecting rearward in a direction perpendicular to said ABS plane and opening at said ABS plane; wherein said trench is wider at said planar trailing-edge surface and tapers downward to form a narrower leading edge; and a main magnetic pole (MP) emerging through said trench, said MP having a trapezoidal planar ABS face symmetrically positioned within said trench at said air-bearing surface (ABS) plane, wherein said MP face is separated from walls of said trench by symmetrically placed side gaps (SG) and a leading-edge gap (LG); and a uniformly thick spin torque oscillator (STO) layer formed contiguous with said planar trailing-edge surface of said dielectric layer, wherein said STO layer covers said planar upper surface, covers openings of said SGs and covers a trailing-edge surface of said MP; then forming a uniformly thick, high moment trailing shield (HMTS) layer contiguously over said STO layer; then trimming said HMTS and said STO layers in a single trimming process so that said two layers are aligned with each other and have equal widths that are equal to the trailing edge width of said MP; then forming a write gap (WG) layer extending symmetrically from each side of said trimmed HMTS and STO layers, said WG layer thereby covering at least a portion of said planar trailing-edge surface of said dielectric layer and completely covering said SGs where they emerge at said dielectric layer at each side of said trench opening; then laterally trimming said WG layer to a final width;

forming a trailing shield around the fabrication of material whose $B_s$ is less than that of said HMTS.

2. The method of claim 1 wherein said HMTS is a layer of magnetic material having a $B_s$ value between approximately 1 kG and 18 kG.

3. The method of claim 1 wherein said HMTS layer has a cross-track width between approximately 4 μm and 30 μm.

4. The method of claim 1 wherein said HMTS layer has a down-track thickness between approximately 100 nm and 2 μm.

5. The method of claim 1 wherein said STO layer is a multi-layered device having a cross-track width and down-track thickness that are each substantially equal to that of said HMTS layer.

6. The method of claim 1 wherein said WG layer is a layer of non-magnetic material and wherein the minimum total width of said WG layer is the width of said STO layer and the maximum width can vary between approximately 10 nm and 1 μm.

7. The method of claim 1 wherein off-center WG layer thickness ranges between approximately 2 nm and 50 nm.

* * * * *